United States Patent

Noguchi et al.

[11] Patent Number: 5,930,470
[45] Date of Patent: Jul. 27, 1999

[54] DEBUGGING SYSTEM AND DEBUGGING METHOD

[75] Inventors: Tomoaki Noguchi; Hideyuki Kawakita, both of Tokyo, Japan

[73] Assignee: Kabushiki Kaisha Toshiba, Kawasaki, Japan

[21] Appl. No.: 08/922,378

[22] Filed: Sep. 3, 1997

[30] Foreign Application Priority Data

Sep. 3, 1996 [JP] Japan .................................. 8-233309

[51] Int. Cl.[6] ...................................................... G06F 11/26
[52] U.S. Cl. .............................. 395/183.14; 395/183.05; 395/701; 395/704
[58] Field of Search ......................... 395/183.04, 183.05, 395/183.14, 183.22, 500, 701, 704

[56] References Cited

U.S. PATENT DOCUMENTS

5,047,926   9/1991   Kuo et al. ................................ 364/200

Primary Examiner—Robert W. Beausoliel, Jr.
Assistant Examiner—Scott T. Baderman
Attorney, Agent, or Firm—Oblon, Spivak, McClelland, Maier & Neustadt, P.C.

[57] ABSTRACT

A target CPU executes a user program in synchronism with an asynchronous operation clock signal at higher speed than an operation clock signal of a debugging object system. A control unit portion outputs address bus information, data bus information, and machine cycle information in operation. A POD portion generates various control signals of the debugging object system based on the machine cycle information and then the address bus information, the data bus information, and the machine cycle information to the debugging object system in synchronism with an operation clock signal of the debugging object system. Collection, output, or process of debugging information can thus be executed by use of difference in execution times of the user program between the debugging object system and the target CPU, without halting the debugging object system.

10 Claims, 6 Drawing Sheets

DEBUGGING SYSTEM AND DEBUGGING METHOD

BACKGROUND OF THE INVENTION

1. Field of the Invention

The present invention relates to a debugging system and a debugging method which can be applied to a development tool for developing and debugging software and hardware for use in microcomputer application products.

2. Description of the Prior Art

A conventional development tool for a microcomputer comprises a controller portion for receiving command input from a host machine operated by a user to control overall operations of the development tool; a portion (referred to as "POD" hereinafter) including target CPUs prepared for respective CPUs of debugging object systems and a control unit for controlling operations of the target CPUs; and a probe portion which has the same terminal arrangement as respective target CPUs and is connected to a terminal, to which the CPU on the debugging object system is connected, to thus supply output signals of the POD to the debugging object system.

When such development tool is employed, first the user pulls out the CPU from the debugging object system and then, in place of the CPU, the probe portion is inserted into a terminal into which the CPU of the debugging object system has been inserted, whereby the development tool is ready for operation. In operation, the development tool can execute debugging operations, e.g., can refer to values of registers in the target CPU, refer to values of variables stored in a memory, rewrite such values of variables, and so forth. However, if values of the registers and contents of memories in the CPU are referred to and the values of the registers and the contents of the memories are altered, such operations have to be executed after the user program which is running in the target CPU is suspended once and then a program used to display and alter the contents of registers and the contents of memories (such program is called a "steal program" hereinafter) is executed by the target CPU.

Accordingly, if a control system program is to be debugged, it has taken an extra time to execute such steal program when I/O operation is to be executed or when the contents of the register and the contents of the memories are to be confirmed or checked in the course of process according to the program. As a result, there are possibilities that not only the program cannot be debugged in real running time, but also various devices connected to the debugging object system are damaged and such devices connected to the debugging object system and the debugging object system itself are destroyed since an operation of the debugging object system, e.g., printer, motor, etc. is inadvertently halted and suspended every confirmation.

As described above, in the debugging system in the prior art, if the contents of the register and the contents of the memories in the target CPU are to be confirmed or altered, the debugging object system cannot be debugged in real time since the extra time to execute a particular program is needed. In addition, since the operation of the debugging object system must be suspended when the contents of the register and the contents of the memories in the target CPU are to be confirmed or altered by executing the particular program, the debugging object system may be affected harmfully.

SUMMARY OF THE INVENTION

Therefore, the present invention has been made in view of the above circumstance and it is an object of the present invention to provide a debugging system and a debugging method which is capable of collecting easily information required for debugging without suspension of the debugging object system.

In order to achieve the above object, according to an aspect of the present invention, there is provided a debugging system comprising a host communication portion for transmitting/receiving necessary information to/from a host machine to execute a debugging process of a debugging object system having a microcomputer; a control unit portion for executing a user program of said debugging object system by a target CPU prior to said debugging object system other than data input operation via an I/O device of said debugging object system in synchronism with an asynchronous operation clock signal at higher speed than an operation clock signal of said debugging object system, and then outputting address bus information, data bus information, and machine cycle information in operation; and a POD portion for receiving said operation clock signal of said debugging system, and said address bus information, said data bus information, and said machine cycle information, which being output from said control unit portion, then generating various control signals for said debugging object system based on said machine cycle information, and then supplying said address bus information, said data bus information, and various control signals to said debugging object system in synchronism with said operation clock signal of said debugging object system; wherein collection, output, or process of debugging information can be executed while operating said debugging object system in synchronism with said operation clock signal of said debugging object system by use of difference in execution times of said user program between said debugging object system and said target CPU in said control unit portion.

In the preferred embodiment of the present invention, said control unit portion includes an emulation memory for storing said user program of said debugging object system and having a tag bit used to instruct replacement of an instruction, a target CPU for executing said user program stored in said emulation memory and a program to execute collection, output, or process of said debugging information, a decoder circuit for generating said machine cycle information based on said address bus information, said data bus information, and said various control signals output from said target CPU according to execution of said user program, and outputting said address bus information, said data bus information, and said machine cycle information to said POD portion, a control circuit for controlling allover operations of said emulation memory, said target CPU, said decoder circuit, and said control unit portion.

In the preferred embodiment of the present invention, said POD portion includes a storing portion for storing said machine cycle information output from said decoder circuit, a storage location counter for indicating a storage location of said machine cycle, an output location counter for indicating execution output location of said machine cycle, a difference value register for holding a difference between said storage location counter and said output location counter and outputting storage capacity of said storing portion to said decoder circuit, an address output circuit for supplying an address to said debugging object system, a data inputting/outputting circuit for inputting/outputting data from/to said debugging object system, and a control signal generating circuit for generating various control signals of said debugging object system based on contents stored in said storing portion and supplying said various control signals to said debugging object system.

In the preferred embodiment of the present invention, if said debugging information are collected from an I/O device of said debugging object system to said control unit portion via said POD portion, said debugging information are collected by designating an address of I/O instruction in advance, replacing said I/O instruction with self-jump instruction directly before execution of said I/O instruction so as to delay execution of said I/O instruction by said target CPU, and executing input of said debugging information supplied from said I/O device as well as said I/O instruction by said target CPU.

In the preferred embodiment of the present invention, if said debugging information are collected from an I/O device of said debugging object system to said control unit portion via said POD portion, said debugging information are collected by discriminating I/O instruction by means of reading an address of I/O instruction, extending an I/O cycle by imposing a weight to said target CPU, execute I/O instruction by releasing said weight of said target CPU as well as inputting said debugging information from said I/O device.

According to another aspect of the present invention, there is provided a debugging method comprising the steps of executing a user program of a debugging object system by a target CPU prior to said debugging object system, other than data input from an I/O device of said debugging object system, in synchronism with an asynchronous operation clock signal at higher speed than an operation clock signal of said debugging object system having a microcomputer; storing address bus information, data bus information, and machine cycle information in operation; generating various control signals of said debugging system based on said machine cycle information stored; supplying said address bus information, said data bus information, and said machine cycle information to said debugging object system in synchronism with an operation clock signal of said debugging object system; and executing collection, output, or process of debugging information while operating said debugging object system in synchronism with said operation clock signal of said debugging object system by use of difference in execution times of said user program between said debugging object system and said target CPU.

DESCRIPTION OF THE PREFERRED EMBODIMENTS

An embodiment of the present invention will be explained with reference to accompanying drawings hereinafter.

Figure 1:
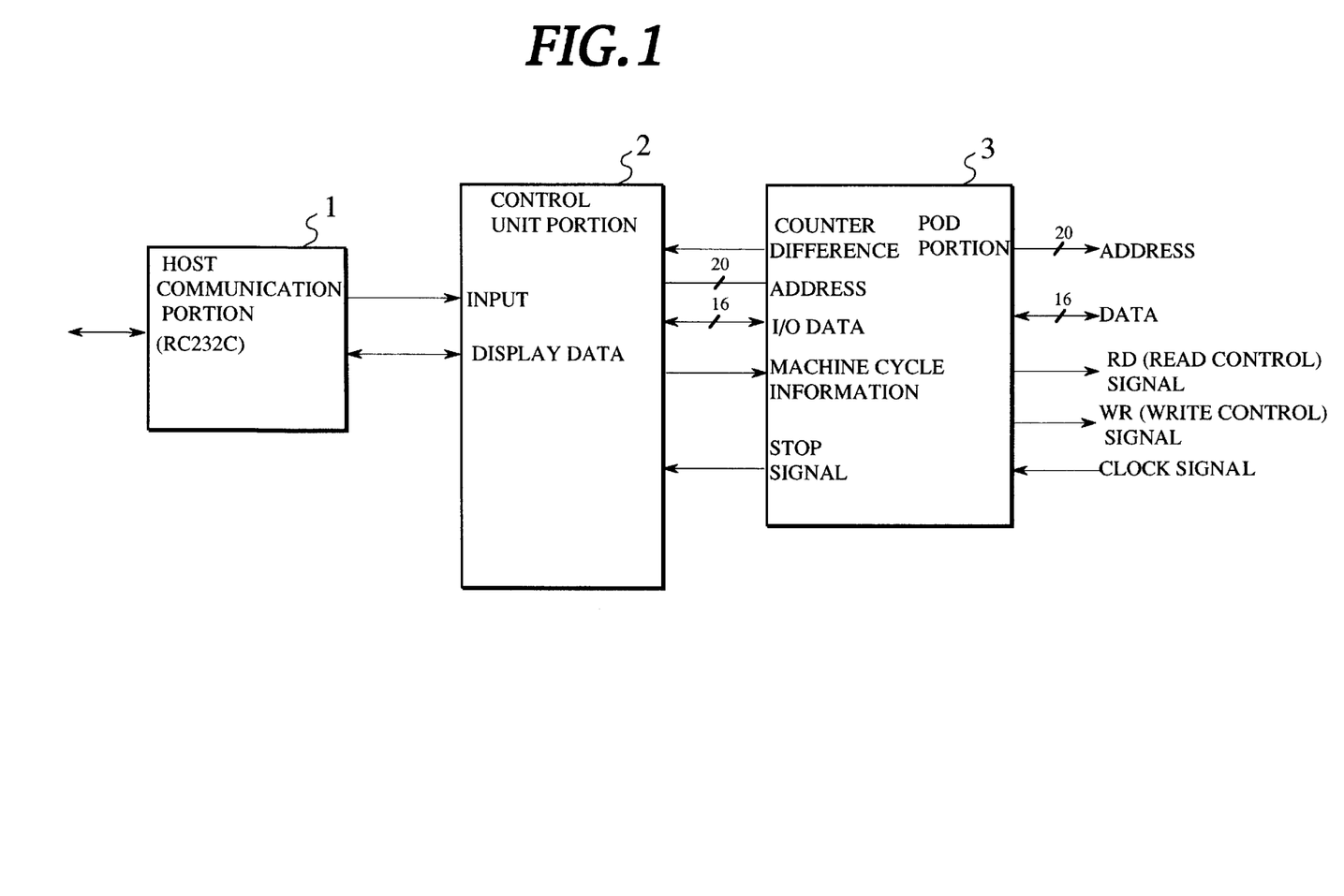
FIG. 1 is a block circuit diagram showing a configuration of a debugging system according to an embodiment of the present invention.

FIG. 1 is a view showing a configuration to realize a debugging system and a debugging method according to an embodiment of the present invention.

In FIG. 1, the debugging system comprises a host communication portion 1, a control unit portion 2, and a POD portion 3.

The host communication portion 1 provides an interface between a host machine (not shown) and the control unit portion 2 of the main body, receives commands from the host machine, and outputs analyzed results of the commands to the control unit portion 2. In addition, the host communication portion 1 sends information for screen display received from the control unit portion 2 to the host machine.

Figure 2:
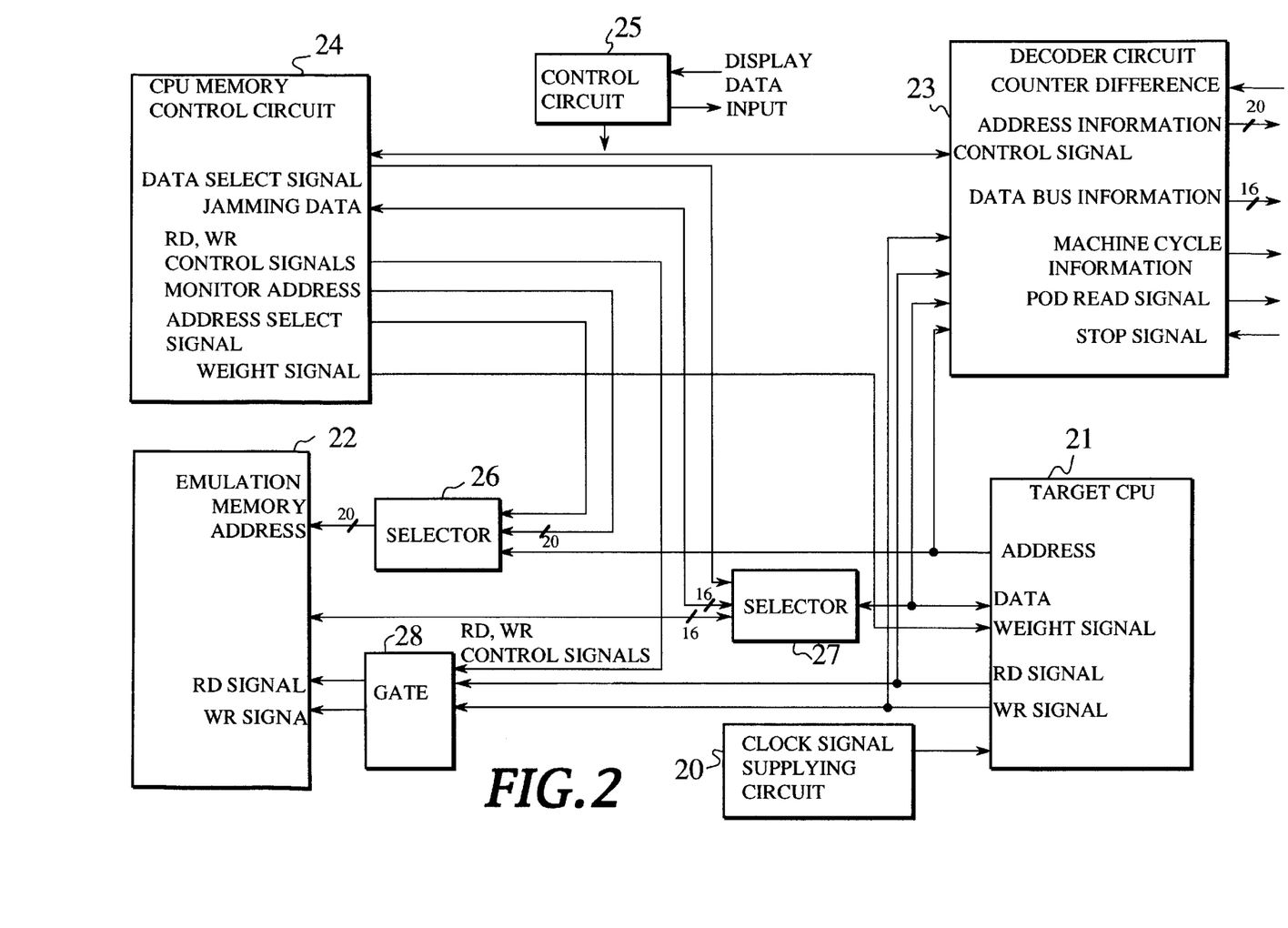
FIG. 2 is a block circuit diagram showing a configuration of a control unit of the debugging system shown in FIG. 1.

As shown in FIG. 2, the control unit portion 2 of the debugging system comprises a clock signal supplying circuit 20 for supplying a clock signal which operates higher than the debugging object system and asynchronously; a target CPU 21 for receiving the clock signal supplied from this clock signal supplying circuit 20 to operate higher than the debugging object system; an emulation memory 22 with a tag (TAG); a decoder circuit 23 for monitoring operations of the target CPU 21 to generate machine cycle information based on addresses which are output from the target CPU 21 to address buses, data which are output from the target CPU 21 to data buses and respective control signals, supplying the machine cycle information to the POD portion 3, and decoding the machine cycle information and states of the POD portion 3 to thus generate a control signal which brings the target CPU 21 into its weighted state in I/O read cycle and makes the target CPU 21 self-jump; a CPU memory control circuit 24 including a circuit for imposing a weight on the target CPU 21 upon I/O read, a circuit for operating the address bus, the data bus, respective control signal lines of memories separately from the target CPU 21, and a circuit for replacing instructions; a control circuit 25 for controlling allover the control unit portion 2 based on input from the host communication portion 1 and outputting display data to the host; a selector 26 for selecting a monitor address supplied from the CPU memory control circuit 24 or an address supplied from the target CPU 21 based on an address select signal supplied from the CPU memory control circuit 24 to send to the emulation memory 22; a selector 27 for selecting jamming data supplied from the CPU memory control circuit 24, data supplied from the target CPU 21, or data supplied from the emulation memory 22 based on a data select signal supplied from the CPU memory control circuit 24 to send to the CPU memory control circuit 24, the target CPU 21, or the emulation memory 22; and a gate 28 for controlling supply of an RD signal and a write signal output from the target CPU 21 to the emulation memory 22 based on RD (read control), WD (write control) signals supplied from the CPU memory control circuit 24.

The clock signal to the target CPU 21 in the control unit 2 is set higher than a clock signal in the debugging object system. The user program is read from the emulation memory 22 and then executed higher than the debugging object system by the target CPU 21. The bit number of the emulation memory 22 is derived by adding one bit to the bit number of the data bus of the target CPU 21 (this portion is called a tag). By setting the bit of the address tag in which I/O input instruction are written to "1", I/O instruction can be replaced to take synchronization with the input supplied from an external device.

The decoder circuit 23 decodes signals output from the target CPU 21, generates machine cycle information indicating what type of machine cycle is executed, and supplies the machine cycle information to the POD portion 3. The user program executes subroutine call, return, branch, etc. Unless instruction fetch addresses of the program are continuous or if data are read/written from/into the memory and the I/O, signal values output onto the address bus are supplied to the POD portion 3 and stored therein. In addition, if data are written into the memory and the I/O, these data values are also supplied to the POD portion 3 and stored therein.

In this manner, the target CPU 21 in the control unit 2 always executes the user program prior to the debugging object system other than data input from the I/O. For this reason, the target CPU 21 has a marginal time by several machine cycles in operation before actual execution time. Therefore, with the use of such marginal time, the target CPU 21 in the control unit 2 is capable of executing a program for sending register values, input values from the I/O, etc. to the host machine and displaying or altering memory values on the way of execution of the user program Since the decoder circuit 23 does not decode signals when the target CPU 21 is executing an operation to send debugging information to the host machine, the machine cycle information in this operation are not supplied to the POD portion 3. Hence, totally same signals as those employed when the target CPU 21 operates as a single body, if viewed from the debugging object system side, can be supplied to the debugging object system. Consequently, without exerting an influence upon operations of the debugging object system, it is possible to read the contents of the registers in the target CPU 21, and so forth.

Figure 3:
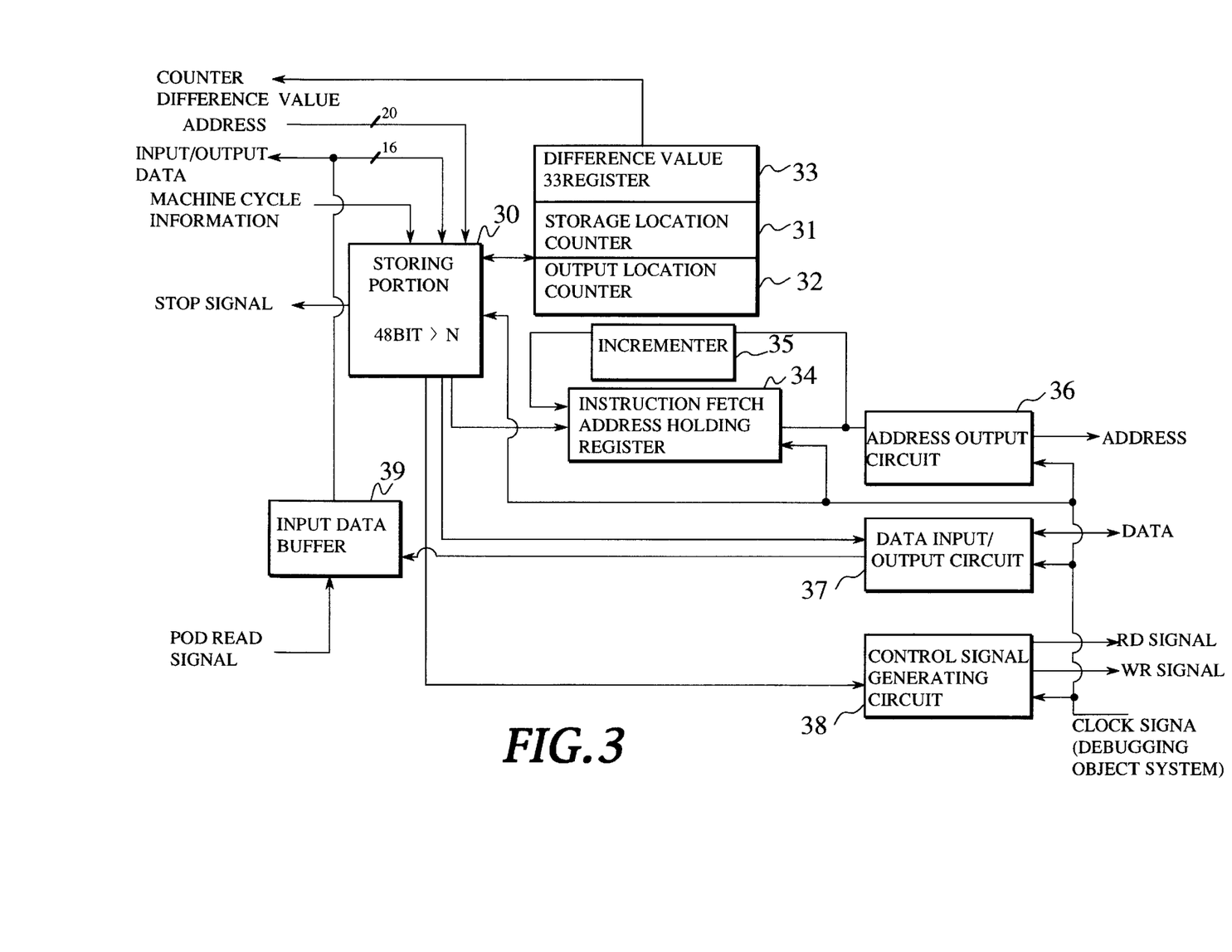
FIG. 3 is a block circuit diagram showing a configuration of a POD portion of the debugging system shown in FIG. 1.

As shown in FIG. 3, the POD portion 3 of the debugging system comprises a storing portion 30 for storing the machine cycle information supplied from the control unit portion 2; a counter 31 for indicating storage location of the machine cycle information; a counter 32 for indicating output location of the machine cycle information; a register 33 for holding a difference value between the counter 31 and the counter 32; an instruction fetch address holding register 34 for holding an instruction fetch address supplied from the control unit portion 2 via the storing portion 30; an incrementer 35 for incrementing the value in the instruction fetch address holding register 34 to supply to the instruction fetch address holding register 34; an address outputting circuit 36 for receiving an address from the instruction fetch address holding register 34 based on the operation clock signal supplied from the debugging object system and then outputting the address to the debugging object system; a data inputting/outputting circuit 37 for executing input/output of data between the POD portion 3 and the debugging object system based on the operation clock signal supplied from the debugging object system; a control signal generating circuit 38 for generating various control signals based on the machine cycle information output from the storing portion 30 and the operation clock signal supplied from the debugging object system and outputting such various control signals to the debugging object system; and an input data buffer 39 for inputting data supplied from the data inputting/outputting circuit 37 into the target CPU 21 via the decoder circuit 23 based on a POD read signal supplied from the decoder circuit 23 in the control unit portion 2.

The POD portion 3 of the debugging system stores the machine cycle information output from the decoder circuit 23 in the control unit portion 2 in the internal storing circuit 30 sequentially, duplicates the address bus signal, various control signals (memory read/write, I/O read/write, etc.) in accordance with the clock signal requested by the debugging object system in the order of output of the target CPU 21, and outputs them.

A capacity of the storing circuit 30 is prepared sufficiently to store N machine cycles (N is integer). The storage location counter 31 for indicating location storing the machine cycle information which is supplied currently, the output location counter 32 for indicating location storing the machine cycle which is outputting a signal currently, and the difference value register 33 for holding difference between locations in the counter 31 and the counter 32 are always updated every time when there occur the input to the storing portion 30 and the output from the storing portion 30. If it is detected by checking the value in the difference value register 33 that storage number of the machine cycle comes up to (N−2) to thus cause overflow soon, a stop signal is rendered active in the storing portion 30 not to receive further machine cycle information. If the stop signal is rendered active, the control unit portion 2 makes the target CPU 21 execute program counter Jump instruction (self-Jump) to an address in which concerned instruction is written. Since this self-Jump is not decoded, it is not treated as the machine cycle information to be supplied to the storing portion 30 in the POD portion 3.

For the above reason, because only such machine cycle signals that have already been stored are output from the POD portion 3 during such time period, the storage number of the machine cycle stored in the storing portion 30 is decreased. Like the above, since the target CPU 21 executes the self-Jump to such an extent that the machine cycle information capable of merely outputting debugging information remains, overflow of the storing portion 30 can be prevented. Thus, the target CPU 21 always executes preceding operation, except for I/O input described later, by several blocks rather than the timing to be output to the debugging object system.

With the above configuration, the target CPU 21 which executes the user program in the control unit portion 2 is operated at higher speed whereas the signals to be output from the POD portion 3 to the debugging object system are stored in the POD portion 3 and then the signals are generated and output by the POD portion 3 in synchronism with the clock signal supplied from the debugging object system according to data indicating the type of the machine cycle to be output. Accordingly, difference in execution times between the target CPU 21 and the debugging object system is generated and then debugging information can be picked up from the target CPU 21 by use of such time difference without affecting the signals to be supplied to the debugging object system.

In the prior art, the POD portion 3 has been equipped with the target CPU 21 and has transmitted/received the address bus signal output from the target CPU 21, the control signals, and data on the data bus to/from the debugging object system via the buffer. However, the address bus signal output from the POD portion 3, data written onto the data bus, the control signals, etc. have been generated affinely by the control signal generating circuit 38 in the POD portion 3 and then output. The control signal generating circuit 38 may reproduce respective machine cycles of the target CPU 21 on the basis of the machine cycle information received from the decoder circuit 23 in the control unit portion 2 in synchronism with the clock signal supplied from the debugging object system.

In writing operations of the memory, first data are written into the emulation memory 22, and then data are written into a memory in the debugging object system at the same timings as those at which the POD portion 3 generates output signals. Reading operation of the memory is executed for the emulation memory 22. Although the POD portion 3 may reproduce the memory read cycle, this read value is in no means input into the target CPU 21.

Writing operations into the I/O are executed when the POD portion 3 generates the signals. Only when I/O reading is executed, all the machine cycles stored in the storing portion 30 of the POD portion 3 are output and also the target CPU 21 receives the values from the debugging object system so as to synchronize with the debugging object system.

Next, an operation of this embodiment will be explained in detail hereinbelow.

First of all, in normal operation, the user program and all data are loaded onto the emulation memory 22 in advance before execution. The user program may either receive from the debugging object system via the POD portion 3 or downloaded from the host machine. During the debugging operation, all the program and the data may be read/written from/into the internal emulation memory 22.

After a reset operation, when the internal target CPU 21 starts its operation, the decoder circuit 23 decodes what machine cycle is executed by this target CPU 21 and then outputs the machine cycle information indicating the type of the machine cycle together with the address bus information and the data bus information to the POD portion 3. If an instruction fetch address is input into the storing portion 30 of the POD portion 3, the address information are also held in the instruction fetch address holding register 34. If the instruction fetch addresses are continued, values which are obtained by incrementing the previously held address by means of the incrementer 35 are output from the clocks. Unless the instruction fetch addresses are continued because conditional/unconditional branch, subroutine call, etc. are executed between such addresses, the address by which the instruction fetch is newly executed from the decoder circuit 23 is supplied to the instruction fetch address holding register 34.

The POD portion 3 stores sequentially the supplied machine cycle information in the storing portion 30 and then outputs address bus, data bus, and other control signals in synchronism with the clock signal of the debugging object system according to the stored machine cycle information. In this embodiment, the machine cycle information are decoded in synchronism with rise-up of the clock signal of the target CPU 21 and then sent to the POD portion 3.

Figure 4:
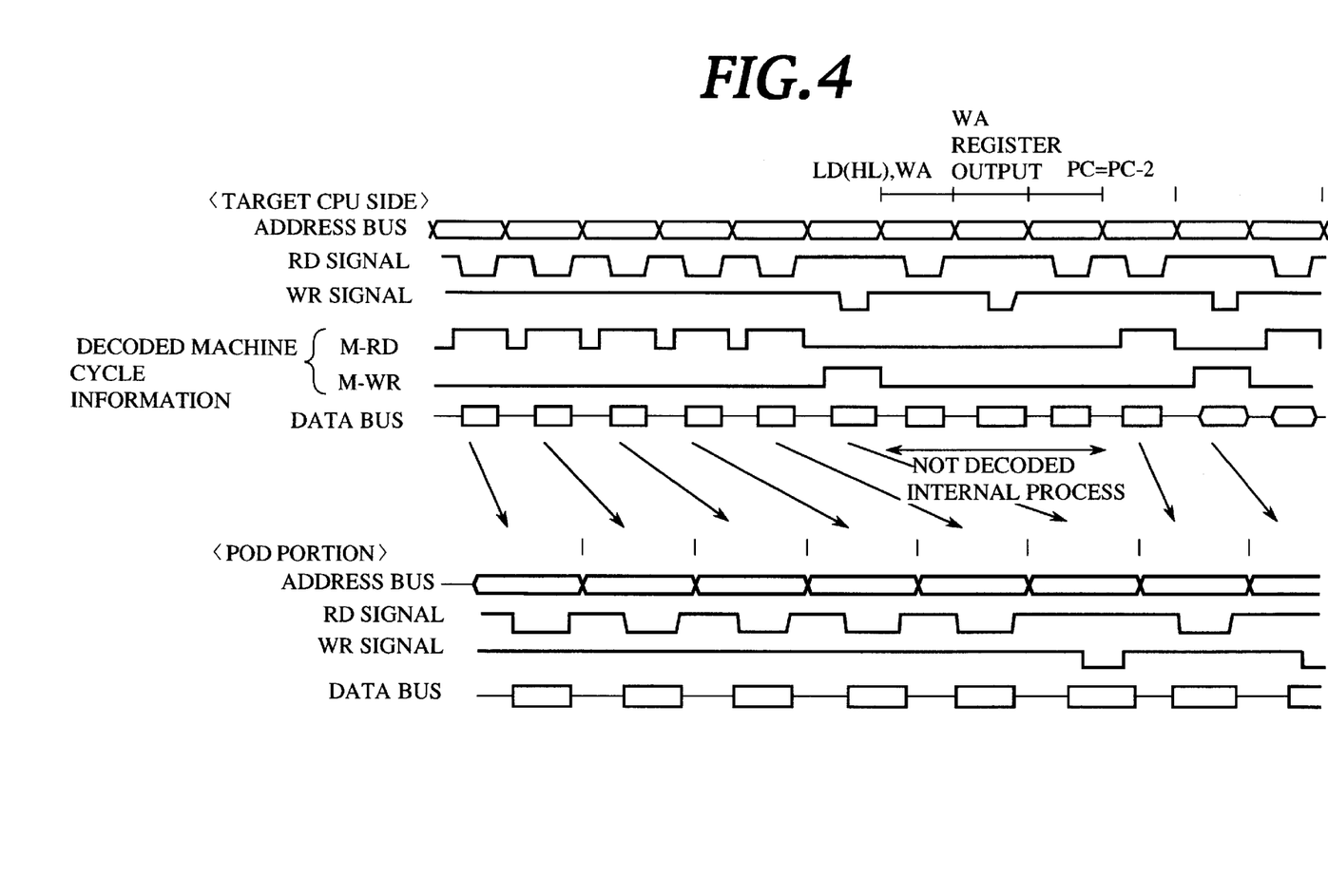
FIG. 4 is a timing chart illustrating an asynchronous operation of the debugging system shown in FIG. 1 and output operation of register values.

In turn, an operation will be explained with reference to a timing chart shown in FIG. 4 hereunder if reading of the register values and altering of the register values are executed, or in the event that the register in the target CPU 21 is read herein.

If the register values are fetched as debugging information, the control unit portion 2 always compares the address by which the instruction is fetched with the address which is designated by the user and written into the comparator. If the address of the program being executed coincides with the designated address according to the comparison result, an instruction (LD (IX), REG) to write the register into the memory by use of an index register is executed on the data bus of the target CPU 21. The register values are output on the data bus at a succeeding machine cycle after this instruction is executed. However, the WR signal in the emulation memory 22 is inhibited by a gate 28 not to be rendered active so that memory values are never rewritten.

The CPU memory control circuit 24 fetches as the register values the data which are output on the data bus during when the WR signal is active. Since the program counter is shifted by executing the load instruction, next the program counter relative Jump instruction is output onto the data bus and executed so as to restore the address of the program to an original address of the user program. During a series of these operations are executed, the decoder circuit 23 is not operated and thus respective signals responding to these operations are not output from the POD portion 3.

When the register values are rewritten, an instruction (LD REG, (IX)) for reading the above instruction from the address indicated by the index register to the register may be replaced. Others are similar to those in reading operation of the register.

However, the number of machine cycle needed to execute the above operations by the internal target CPU 21 without affecting the signal output from the POD portion 3 is known previously. Unless the internal target CPU 21 advances prior to the program by more than the number of machine cycle, the above operations cannot be executed. Hence, in order to check how many machine cycles are stored in the storing portion 30 of the POD portion 3, the value of the difference value register 33 indicating difference between the storage location and the location at which the signal is being output from the POD portion 3 is referred to. Unless the stored machine cycle information are stored to such an extent that these operations can be executed, read/write operations from/to the registers in the target CPU 21 cannot be executed.

Next, when the internal target CPU 21 outputs to the I/O, I/O address and output data together with the machine cycle information indicating the I/O output operation are supplied to the storing portion 30 in the POD portion 3. Then, a writing operation is performed by generating this timing signal by virtue of the POD portion 3.

In order to provide input from the I/O to the target CPU 21, two ways are prepared. In either case, the internal target CPU 21 waits for external input until external input can be defined.

Figure 5:
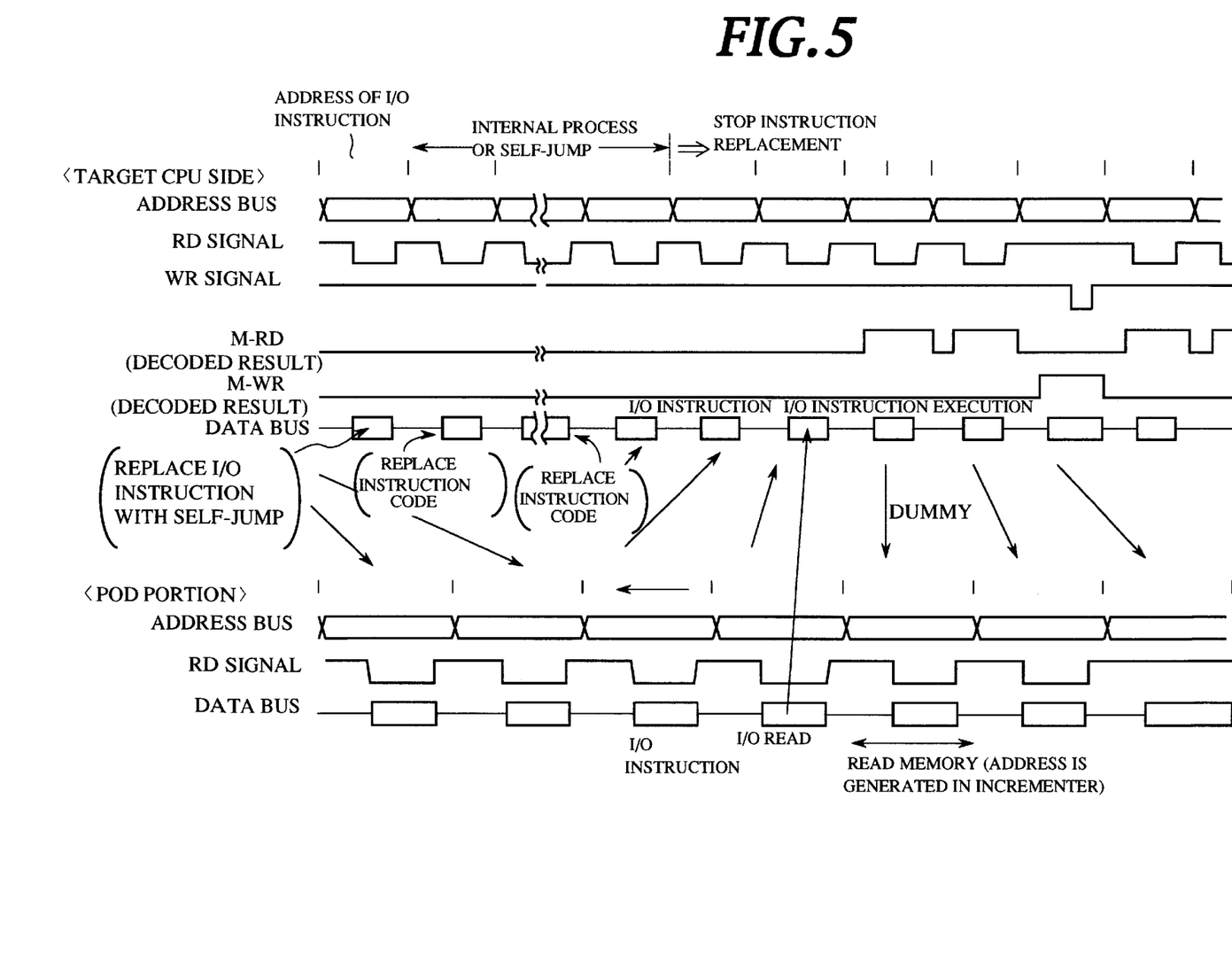
FIG. 5 is a timing chart illustrating an I/O input operation of the debugging system shown in FIG. 1.

First, a first way will be explained with reference to a timing chart shown in FIG. 5 hereunder.

The first way is a case where the address having the I/O instruction is designated. In this case, if the user designates this address previously before execution of the debugging operation, the tag portion of the designated address in the emulation memory 22 is set to "1". Upon execution of the program on the emulation memory 22, this instruction is replaced in the CPU memory control circuit 24 with the program counter relative Jump instruction supplied to the address in which the instruction is written immediately before the tag executes the instruction designated by the address being set to "1", and then execution of the instruction is continued until the POD portion 3 comes up to the I/O instruction execution cycle. The target CPU 21 can also receive data at the same timing when the input from the POD portion 3 is defined.

Figure 6:
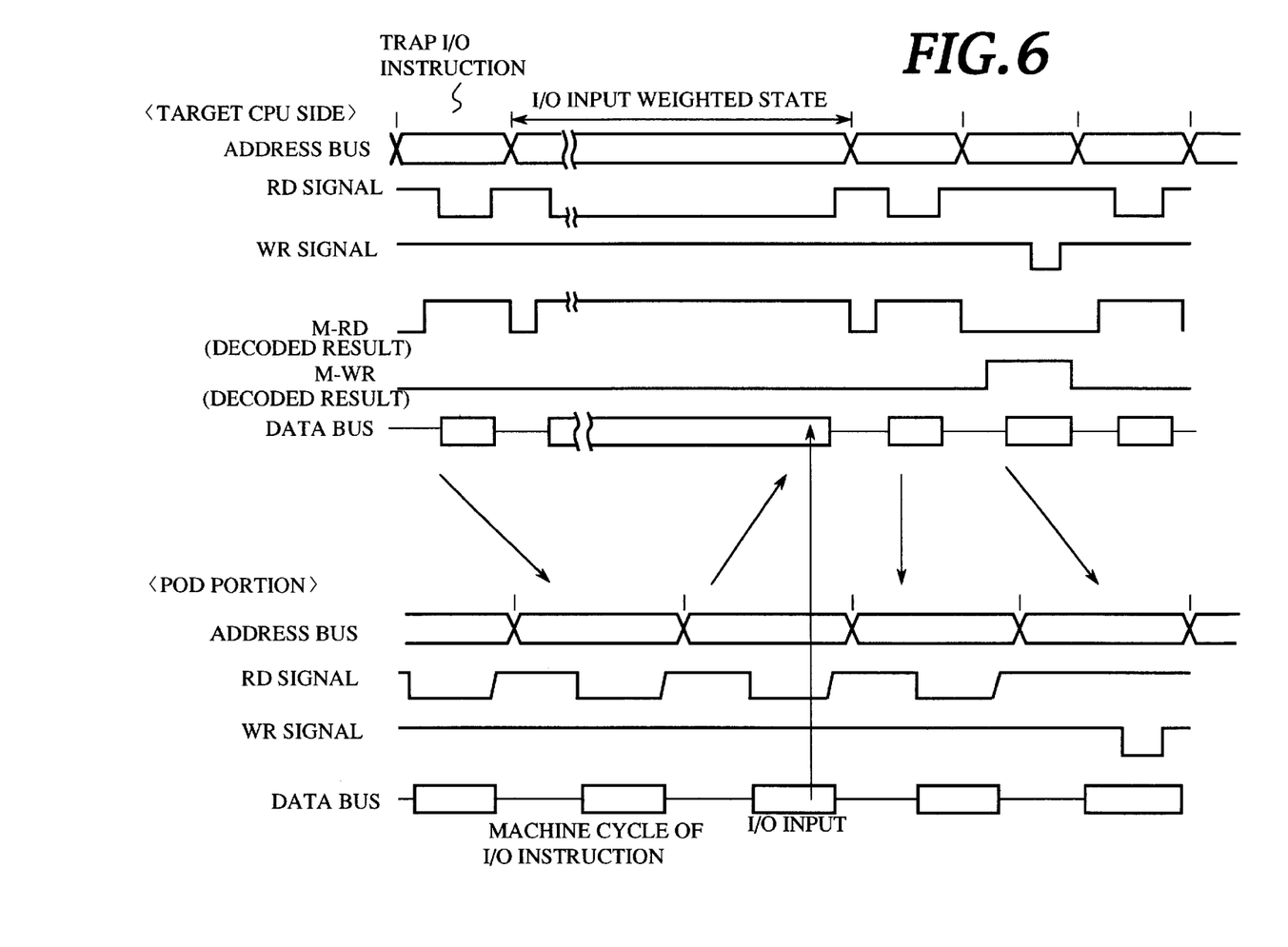
FIG. 6 is another timing chart illustrating an I/O input operation of the debugging system shown in FIG. 1.

Next, a second way will be explained with reference to a timing chart shown in FIG. 6 hereunder.

The second way is a case where the address having the I/O instruction is not designated. In this case, since the decoder circuit 23 can discriminate by executing the I/O read cycle that the read address is the I/O address, it imposes a weight to the target CPU 21 so as to extend the I/O cycle. It is waited, while the I/O cycle being extended, that the signal output from the POD portion 3 executes the I/O cycle. The decoder circuit 23 can receive data from the debugging object system approximately simultaneously to the POD portion 3.

In both cases, decoding of the operation of the target CPU 21 is not ready for the machine cycle in the wake of the I/O input cycle and therefore, under the assumption that the cycle is the instruction fetch cycle only in this one machine cycle, an instruction fetch cycle signal can be generated with the use of the incremented value in the instruction fetch address holding register 34.

Like this, in the above embodiment, it is feasible to pick up easily information necessary for the debugging operation in the course of process for the same execution time as that required when the actual target CPU is employed, without halting the debugging object system, which is impossible in the prior art. Therefore, an environment can be provided by the above embodiment wherein development of microcomputer application products can be readily carried out.

In addition, in the conventional development tool, the signals for executing the steal program have been output onto the signal lines such as the address bus, the data bus when the target CPU in the POD portion executes the steal program. Therefore, in order not to cause malfunction of the debugging object system even when these signals are output from the target CPU, it has been needed that respective signals output from the target CPU are output to the debugging object system via the buffer to separate unnecessary operations of the signal lines from the debugging object system, whereby preventing the malfunction of the debugging object system. In the embodiment of the present invention, since the signals can be output without the circuit to prevent such malfunction, delay time of respective signals being output from the debugging object system can be lessened smaller, so that development of the debugging system for debugging the high speed CPU can be facilitated.

Furthermore, if an operation speed of the software emulation is accelerated in the future, the target CPU 21, the decoder circuit 23, and the emulation memory 22 can be replaced with software emulation.

As described earlier, according to the present invention, since collection, output, or process of debugging information is executed by using difference in execution time of the user program between the debugging object system and the target CPU, the debugging information from the debugging object system can be collected, output, or processed without suspending operations of the debugging object system. Accordingly, development of the microcomputer application products can be easily conducted.

What is claimed is:

1. A debugging system comprising:

a host communication portion for transmitting/receiving necessary information to/from a host machine to execute a debugging process of a debugging object system having a microcomputer;

a control unit portion for executing a user program of said debugging object system by a target CPU prior to said debugging object system other than data input operation via an I/O device of said debugging object system in synchronism with an asynchronous operation clock signal at higher speed than an operation clock signal of said debugging object system, and then outputting address bus information, data bus information, and machine cycle information in operation; and a POD portion for receiving said operation clock signal of said debugging system, and said address bus information, said data bus information, and said machine cycle information, which being output from said control unit portion, then generating various control signals for said debugging object system based on said machine cycle information, and then supplying said address bus information, said data bus information, and various control signals to said debugging object system in synchronism with said operation clock signal of said debugging object system;

wherein collection, output, or process of debugging information can be executed while operating said debugging object system in synchronism with said operation clock signal of said debugging object system by use of difference in execution times of said user program between said debugging object system and said target CPU in said control unit portion.

2. A debugging system according to claim 1, wherein, if said debugging information are collected from an I/O device of said debugging object system to said control unit portion via said POD portion, said debugging information are collected by designating an address of I/O instruction in advance, replacing said I/O instruction with self-jump instruction directly before execution of said I/O instruction so as to delay execution of said I/O instruction by said target CPU, and executing input of said debugging information supplied from said I/O device as well as said I/O instruction by said target CPU.

3. A debugging system according to claim 1, wherein, if said debugging information are collected from an I/O device of said debugging object system to said control unit portion via said POD portion, said debugging information are collected by discriminating I/O instruction by means of reading an address of I/O instruction, extending an I/O cycle by imposing a weight to said target CPU, execute I/O instruction by releasing said weight of said target CPU as well as inputting said debugging information from said I/O device.

4. A debugging system according to claim 1, wherein said control unit portion includes, an emulation memory for storing said user program of said debugging object system and having a tag bit used to instruct replacement of an instruction, a target CPU for executing said user program stored in said emulation memory and a program to execute collection, output, or process of said debugging information, a decoder circuit for generating said machine cycle information based on said address bus information, said data bus information, and said various control signals output from said target CPU according to execution of said user program, and outputting said address bus information, said data bus information, and machine cycle information to said POD portion, a control circuit for controlling allover operations of said emulation memory, said target CPU, said decoder circuit, and said control unit portion.

5. A debugging system according to claim 4, wherein, if said debugging information are collected from an I/O device of said debugging object system to said control unit portion via said POD portion, said debugging information are collected by designating an address of I/O instruction in advance, replacing said I/O instruction with self-jump instruction directly before execution of said I/O instruction so as to delay execution of said I/O instruction by said target CPU, and executing input of said debugging information supplied from said I/O device as well as said I/O instruction by said target CPU.

6. A debugging system according to claim 4, wherein, if said debugging information are collected from an I/O device of said debugging object system to said control unit portion via said POD portion, said debugging information are collected by discriminating I/O instruction by means of reading an address of I/O instruction, extending an I/O cycle by imposing a weight to said target CPU, execute I/O instruction by releasing said weight of said target CPU as well as inputting said debugging information from said I/O device.

7. A debugging system according to claim 4, wherein said POD portion includes, a storing portion for storing said machine cycle information output from said decoder circuit, a storage location counter for indicating a storage location of said machine cycle information, an output location counter for indicating execution output location of said machine cycle information, a difference value register for holding a difference between said storage location counter and said output location counter and outputting storage capacity of said storing portion to said decoder circuit, an address output circuit for supplying an address to said debugging object system, a data inputting/outputting circuit for inputting/outputting data from/to said debugging object system, and a control signal generating circuit for generating various control signals of said debugging object system based on contents stored in said storing portion and supplying said various control signals to said debugging object system.

8. A debugging system according to claim 7, wherein, if said debugging information are collected from an I/O device of said debugging object system to said control unit portion via said POD portion, said debugging information are collected by designating an address of I/O instruction in advance, replacing said I/O instruction with self-jump instruction directly before execution of said I/O instruction so as to delay execution of said I/O instruction by said target CPU, and executing input of said debugging information supplied from said I/O device as well as said I/O instruction by said target CPU.

9. A debugging system according to claim 7, wherein, if said debugging information are collected from an I/O device of said debugging object system to said control unit portion via said POD portion, said debugging information are collected by discriminating I/O instruction by means of reading an address of I/O instruction, extending an I/O cycle by imposing a weight to said target CPU, execute I/O instruction by releasing said weight of said target CPU as well as inputting said debugging information from said I/O device.

10. A debugging method comprising the steps of:

executing a user program of a debugging object system by a target CPU prior to said debugging object system, other than data input from an I/O device of said debugging object system, in synchronism with an asynchronous operation clock signal at higher speed than an operation clock signal of said debugging object system having a microcomputer;

storing address bus information, data bus information, and machine cycle information in operation;

generating various control signals of said debugging system based on said machine cycle information stored;

supplying said address bus information, said data bus information, and said machine cycle information to said debugging object system in synchronism with an operation clock signal of said debugging object system; and executing collection, output, or process of debugging information while operating said debugging object system in synchronism with said operation clock signal of said debugging object system by use of difference in execution times of said user program between said debugging object system and said target CPU.

* * * * *